March 16, 1937. J. G. ALTHER 2,074,198
TREATMENT OF HYDROCARBON OIL
Original Filed Jan. 6, 1932 2 Sheets-Sheet 1
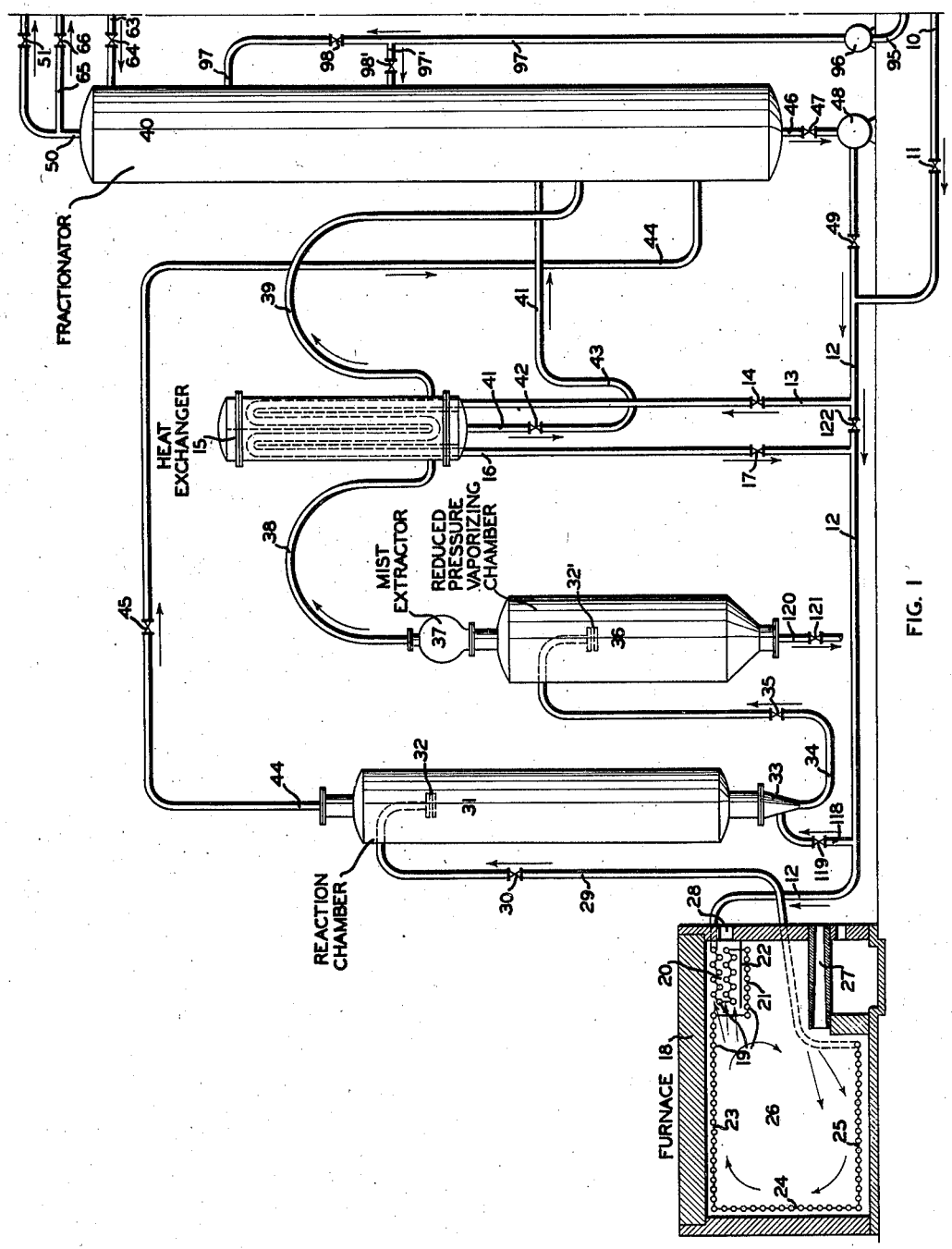
INVENTOR
JOSEPH G. ALTHER
BY Frank L. Belknap
ATTORNEY

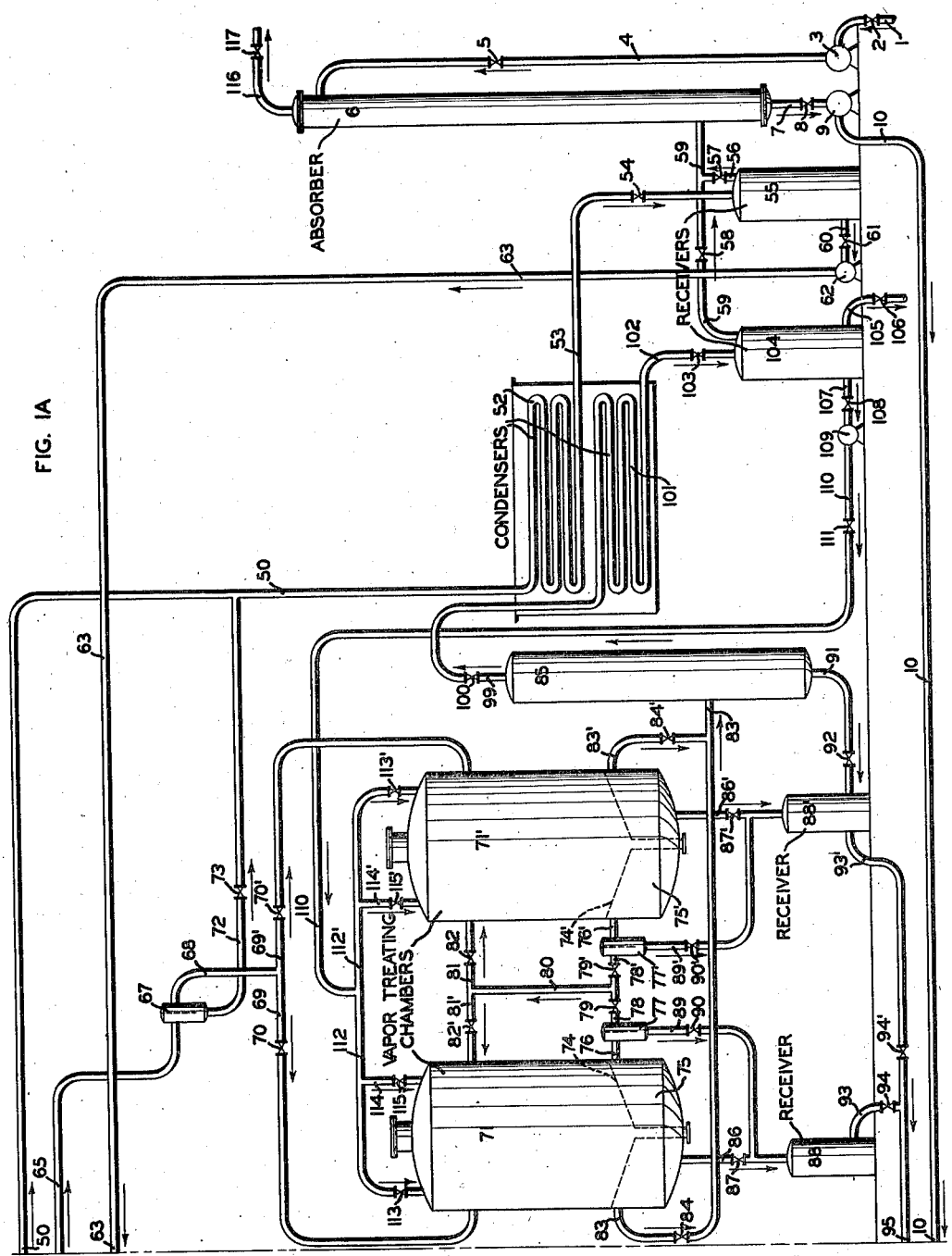

Patented Mar. 16, 1937

2,074,198

UNITED STATES PATENT OFFICE 2,074,198

TREATMENT OF HYDROCARBON OIL

Joseph G. Alther, Chicago, Ill., assignor, by mesne assignments, to Universal Oil Products Company, Chicago, Ill., a corporation of Delaware Application January 6, 1932, Serial No. 584,946
Renewed November 13, 1935

1 Claim. (Cl. 196—96)

This invention relates to a process and apparatus for the treatment of hydrocarbon oils and more particularly is directed to an apparatus suitable for cracking petroleum to produce motor fuel of high antiknock value from heavier oils or oils of generally inferior quality although the apparatus itself is not necessarily limited to such use.

One specific embodiment of the invention may comprise a heating element located within a furnace for heating the oil to the desired conversion temperature, a reaction chamber wherein continued conversion, particularly of vaporous products from the heating element, is effected, a vaporizing or reduced pressure chamber for final separation of vaporous and non-vaporous conversion products and further vaporization of the latter, a heat exchanger wherein oil supplied to the heating element of the system is preheated by indirect contact with relatively hot vapors from said vaporizing chamber, a fractionator for the purpose of separating the desirable light components of the vaporous products of the system from their relatively heavy components, means for returning said relatively heavy components to the heating element for further conversion, a vapor treating chamber or chambers for the purpose of effecting polymerization of deleterious components of the vapors from the fractionator, such as gum and color-forming materials, means of separating said deleterious materials from the treated vapors and means of returning them to the fractionator of the system, means for condensing, cooling and collecting the desirable light liquid product of the system and separating it from uncondensable gases, means for controlling the vapor outlet temperature from the fractionator comprising cooling, condensing and returning to the upper portion of said fractionator a portion of the untreated vapors withdrawn therefrom, means for directly contacting uncondensable gases from the system with raw oil charging stock for the purpose of substantially stripping said gases of entrained desirable liquefiable components and means employing the return of a portion of the combined feed, such as supplied to the heating element of the system, into the lower portion of said reaction chamber to commingle with and prevent the substantial formation of pitchy or carbonaceous materials in the products withdrawn therefrom.

The attached diagrammatic drawings, Figures 1 and 1A, illustrate the specific embodiment above described as well as some of the many various minor modifications which may be employed and the following description of the apparatus includes a description of its operation.

The raw oil charging stock to be treated is supplied through line 1 and valve 2 to pump 3 from which it is fed through line 4 and valve 5 to absorber 6 which contains any suitable form of contacting means, not shown, such as packing, bubble trays, perforated pans or the like, whereby raw oil is directly and intimately contacted with gases from the process, absorbing condensable components of the gases and passing in its enriched state from the lower portion of the absorber through line 7 and valve 8 to pump 9. From pump 9 the enriched raw oil is fed through line 10 and valve 11 into line 12 commingling in line 12 with insufficiently converted intermediate products condensed in the fractionator of the system as will be later more fully described, forming the combined feed for the system. Said combined feed passes, preferably from line 12 through line 13 and valve 14 to heat exchanger 15 where it is preheated by indirect contact with the relatively hot vaporous products of the system, as will be later more fully described, passing through line 16 and valve 17 back into line 12 and thence into furnace 18. A portion or all of the combined feed may, if desired, pass through valve 122, in line 12, thus bypassing heat exchanger 15.

Furnace 18, as here illustrated, supplies both radiant and convection heat to the oil undergoing treatment. The heating element comprises a plurality of tubes 19 connected in series at their ends through suitable return bends, not illustrated. The oil enters convection bank of tubes 20 flowing, as illustrated, through the upper two rows of tubes in this bank, transferring thence to the lower two rows of tubes and passing from convection bank 20 to a row of tubes 21 located below convection bank 20 and separated therefrom by a baffle 22 of any suitable material. The oil flows from tube bank 21 through the bank of radiant roof tubes 23, thence through the rear wall radiant bank of tubes 24 and finally to the floor bank of radiant tubes 25 and thence out of the furnace. Combustible materials comprising any suitable fuel such as oil, gas, pulverized solid fuel or combinations of these admixed with air or other combustion supporting medium is supplied to the combustion zone 26 of the furnace through one or preferably a plurality of firing tunnels 27, only one such tunnel being visible in the particular elevation of the furnace illustrated. The circulation of furnace gases in the combustion zone is substantially that indicated by the arrows, combustion products passing from the combustion zone around the convection tube bank 20 and out of the furnace through flue 28 to a stack, not shown. It will be evident from the drawings and from the description that the oil is subjected, in furnace 18, to a progressively increasing rate of heat and a progressively increasing temperature, leaving the furnace at substantially the maximum temperature to which it is subjected. It will be understood that other furnace flow arrangements may be employed without departing from the scope of the invention.

Heated oil is discharged from furnace 18 through line 29 and valve 30 to reaction chamber 31, preferably entering the reaction chamber in its upper portion and being sprayed into the reaction zone by any well known means of spray or spreader arrangement 32. Non-vaporous conversion products are quickly separated from the slower moving vapors in chamber 31, collecting in the lower portion 33 of the chamber which may, if desired, be cone shaped, as illustrated in the drawings, and passing therefrom together with vaporous conversion products through line 34 and valve 35 to vaporizing chamber 36. By this arrangement vaporous conversion products are subjected to continued conversion for a predetermined time in chamber 31 while non-vaporous conversion products are rapidly removed from the reaction zone without being subjected to prolonged conversion. If desired, a portion of the combined feed passing through line 12 may be directed through line 118 and valve 119 into the lower portion 33 of the reaction chamber, commingling with the products withdrawn from this zone, serving to cool them to the desired temperature and, by virtue of the dilution of the conversion products and the increased velocity in line 34 as well as by the lowered temperature which the introduction of combined feed effects, the accumulation of pitch-like or carbonaceous material in line 34 is substantially prevented, thus keeping line 34 and valve 35 clear and open.

Chamber 36 is preferably maintained under substantially reduced pressure relative to that employed in chamber 31. The conversion products from chamber 31 are introduced into this zone preferably through a suitable form of spray or spreader arrangement 32' and by virtue of the latent heat liberated by the pressure reduction as well as the partial pressure effect of the vapors, substantial further vaporization and cooling of the residual conversion products is effected. The residual liquid product of the system is withdrawn from chamber 36 through line 120 and valve 121 to cooling and storage or to any desired further treatment. Vapors from chamber 36 pass through mist extractor 37 which contains any suitable form of baffling means, not shown, whereby relatively heavy entrained liquid is removed from the vapors. The vapors thence pass through line 38 to heat exchanger 15 where they preheat the combined feed by indirect contact therewith, the uncondensed vapors passing through line 39 to fractionator 40 while condensate from the heat exchanger passes through line 41, valve 42 and trap 43 also to fractionator 40.

Gases which may be segregated from the conversion products in chamber 31 as well as a portion of said vaporous products may be withdrawn from the chamber through line 44 and valve 45 and introduced into fractionator 40, preferably at a point below the level of reflux condensate maintained in this zone, serving the purpose of reboiling the reflux condensate and substantially freeing it of entrained desirable light products and at the same time preventing the formation of a gas pocket in the upper portion of chamber 31.

Fractionator 40 contains any suitable fractionating means, not shown, such as perforated pans, bubble trays, packing or the like or combinations of the same and the vaporous conversion products supplied to this zone are fractionated for the purpose of separating their relatively light desirable components from their relatively heavy insufficiently converted components, which latter are condensed in the fractionator, collecting in the lower portion thereof and passing therefrom through line 46 and valve 47 to pump 48 from which they are fed through line 12 and valve 49 to furnace 18 for further conversion, together with raw oil charging stock for the process, as already described.

Vapors from fractionator 40 are withdrawn through line 50 and may pass, in part, through valve 51 to condensation and cooling in condenser 52, distillate and uncondensable gas from which passes through line 53 and valve 54 to be collected in receiver 55. Uncondensable gases released from receiver 55 may pass through line 56 and valve 57 and through line 59 to absorber 6. The condensed distillate is withdrawn from receiver 55 through line 60 and valve 61 to pump 62 by means of which it is recirculated through line 63 and valve 64 to the upper portion of fractionator 40 for the purpose of assisting fractionation in this zone and maintaining the desired vapor outlet temperature. Vapors of the desired end boiling point, comprising that portion of the vapors not condensed and recirculated as a control means, as just described, are diverted from line 50 through line 65 and valve 66, passing through knock-out drum 67 and line 68 either through line 69 and valve 70 to vapor treating chamber 71 or through line 69' and valve 70' to vapor-treating chamber 71', or, if desired, in part to both chambers simultaneously. Any condensate removed from the vapors in knock-out drum 67 may be withdrawn through line 72 and valve 73 into line 50, passing together with the vapors in this line, as already described, through condenser 52, line 53 and valve 54 to be collected in receiver 55.

Vapor treating chambers 71 and 71' each contain a bed of polymerizing material such as fuller's earth, diatomaceous earth, contact clays or other suitable treating material through which the vapors are passed, preferably in a downward direction, for the purpose of effecting polymerization and separation from the vapors of deleterious components such as gum and color-forming components. The same or different treating materials may be used in each of the chambers, being supported, for example, by perforated plates 74 and 74' covered, if desired, by a screen, not shown, of suitable mesh which will retain the clay but permit the passage of vapors and polymerization products into the lower portions 75 and 75' of the treating chambers. The treating chambers may be operated simultaneously, if desired, but ordinarily will be connected in series, in which case the vapors may, for example, first enter chamber 71, passing through the bed of treating material, not illustrated, in this zone, vapors and condensed products separating in the lower portion 75 of the chamber, treated vapors from chamber 71 thence passing through line 76, knock-out drum 77, line 78, valve 79, to line 80, line 81 and valve 82 into chamber 71' where they are further treated by contact with the bed of treating material, not illustrated, in this chamber, distillate and additional condensation products separating in the lower portion 75' of chamber 71, the treated vapors passing from this zone through line 83', valve 84', and line 83 to fractionator 85. It will be understood that the reverse of this flow may be employed, if desired, in which case vapors first are treated in chamber 71', are transferred to chamber 71 through line 76', knock-out drum 77', line 78', valve 79', line 80, line 81' and valve 82' while treated vapors from chamber 71 pass through line 83 and valve 84 to fractionator 85. It will also be understood that either treating chamber may be utilized alone or that the two may be operated in parallel, if desired, the arrangement of lines and valves shown also permitting this practice. Condensation products from chamber 71 pass through line 86 and valve 87 to receiver 88 while condensation products from chamber 71' may pass through line 86' and valve 87' to collection in receiver 88'. Condensate separating from the vapors in knock-out drum 77 may pass through line 89 and valve 90 to be collected in receiver 88, while condensate from knock-out drum 77' may pass through line 89' and valve 90' to be collected in receiver 88'.

Fractionator 85 contains any suitable form of fractionating means such as perforated pans, bubble trays, packing or the like or a combination of these and, by fractionation of the treated vapors in this zone, further separation of polymerization products and/or other deleterious components is effected. The condensate from fractionator 85 passes through line 91 and valve 92 to receiver 88'. This product as well as any other condensate collecting in receivers 88 and 88' is withdrawn therefrom through lines 93 and 93' respectively, controlled respectively by valves 94 and 94', passing through line 95 to pump 96 from which they are returned through line 97 to fractionator 40, entering this zone at any desired point, for example, through valve 98, in line 97, into the upper portion of the fractionator or through line 97' and valve 98' into a lower point in the fractionating zone.

Treated and fractionated vapors from fractionator 85 pass through line 99 and valve 100, are subjected to condensation and cooling in condenser 101, distillate and uncondensable gas from which passes through line 102 and valve 103 to be collected in receiver 104. Distillate of the desired character, preferably of substantially motor fuel boiling range of relatively low gum content, good color and gum stability and of relatively high anti-knock value, is withdrawn from receiver 104 through line 105 and valve 106. A portion of the finished product of the system may, if desired, be withdrawn from receiver 104 through line 107 and valve 108 to pump 109 from which it is supplied through line 110, valve 111 through line 112, controlled by valve 113 and through line 114 controlled by valve 115 to chamber 71 and/or from line 110 through line 112' controlled by valve 113' and line 114' controlled by valve 115' to chamber 71', preferably being supplied to each of these zones intermittently for the purpose of spraying the treating material and washing deleterious polymerization products from the bed of treating material into the lower portion 75 and 75' of the treating chambers to revive the treating material and render it more active. Uncondensable gas is released from receiver 104 through line 59 and valve 58, passing together with uncondensable gas from receiver 55 to absorber 6 where the gas is intimately contacted with incoming raw oil for the system, as already described, to substantially strip the gas of any entrained condensable material. The stripped gas is removed from absorber 6 through line 116 and valve 117.

It will be understood that the invention is not limited to any specific temperature and pressure conditions as it is possible to employ substantially equalized pressure throughout the apparatus, allowing for loss of pressure head, due to the friction through the equipment, or differential pressures may be employed between any of the various elements. It will also be understood that the apparatus is not limited to the specific details illustrated in the drawings except as set forth in the appended claim.

I claim as my invention:

An oil treating apparatus comprising in combination a fractionator and means for supplying vapors thereto, a treating chamber and a condenser, means for passing vapors directly from the fractionator to the condenser without passage through the treating chamber, means for returning condensate formed in the condenser to the fractionator, means for passing additional vapors from the fractionator to the treating chamber, a second condenser adapted to receive vapors from the treating chamber, and means for introducing to the treating chamber condensate formed in the second condenser.

JOSEPH G. ALTHER.